United States Patent [19]

Meier

[11] 4,362,223

[45] Dec. 7, 1982

[54] SOUND ABSORBING DEVICE

[76] Inventor: Irmhild Meier, Am Menzelberg 6, 3400 Goettingen 1, Fed. Rep. of Germany

[21] Appl. No.: 194,020

[22] Filed: Oct. 6, 1980

[30] Foreign Application Priority Data

May 18, 1979 [DE] Fed. Rep. of Germany ....... 2920278

[51] Int. Cl.$^3$ ......................... F01N 1/06; E04F 17/04
[52] U.S. Cl. .................................. 181/206; 181/224; 181/268
[58] Field of Search ............... 181/224, 251, 268, 272, 181/275, 206; 55/276

[56] References Cited

U.S. PATENT DOCUMENTS

| | | | |
|---|---|---|---|
| 3,113,635 | 12/1963 | Allen et al. | 181/268 X |
| 3,177,972 | 4/1965 | Wirt | 181/268 |
| 4,109,750 | 8/1978 | Wirt | 181/224 |

FOREIGN PATENT DOCUMENTS

| | | | |
|---|---|---|---|
| 949428 | 8/1956 | Fed. Rep. of Germany | 181/268 |
| 495669 | 11/1938 | United Kingdom | 181/224 |
| 636676 | 5/1950 | United Kingdom | 181/275 |

OTHER PUBLICATIONS

VDI-Richtlinien, VDI 2567, "Schallschutz durch Schalldampfer," Sep. 1971.

*Primary Examiner*—L. T. Hix
*Assistant Examiner*—Thomas H. Tarcza

[57] ABSTRACT

Apparatus for damping a sound field propagating in a fluid propagation medium within a channel (1) having a closed cross-section periphery, including at least one but preferably a plurality of lattice members (2) spaced within the channel (1), each of the lattice members have partition walls subdividing the free channel cross-section into a plurality of partial channels (3) which have a length which is larger than the width of the channels, each lattice member is open at both ends, the length of the partial channels runs parallel the main channel and wherein adjacent partial channels (3) have different length for the sound oscillation state, whereby in the adjacent partial channels local sound pressure differences are produced over their length, which are at least partly compensated by having said partition walls permeable for the propagation medium to permit a local sound pressure transmission from one partial channel into the other.

14 Claims, 3 Drawing Figures

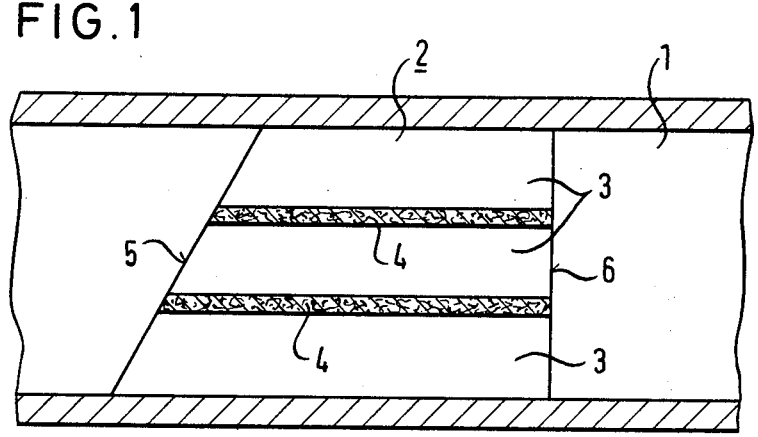
FIG. 1
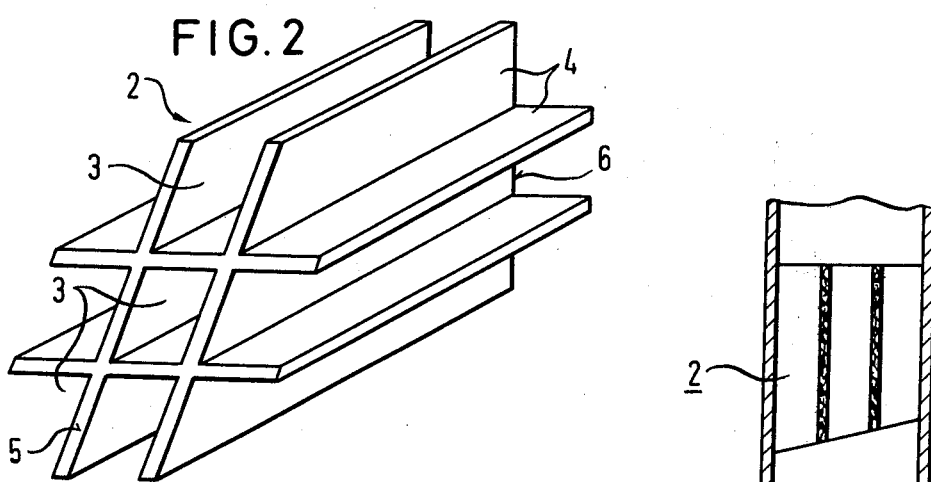
FIG. 2
FIG. 3
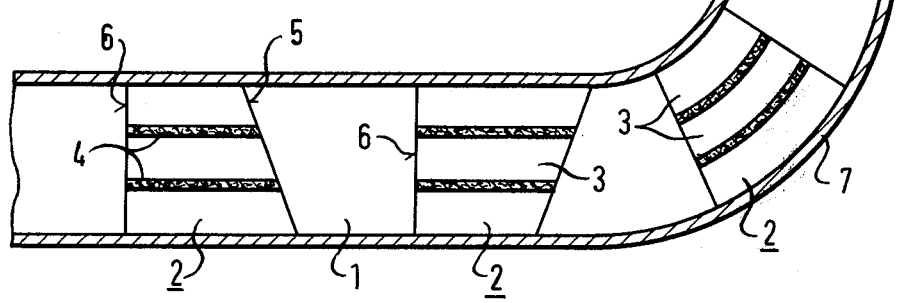

SOUND ABSORBING DEVICE

FIELD OF THE INVENTION

The present invention relates to a sound absorbing device for absorbing the sound of a sound field propagating in a liquid or in a particular gaseous propagation medium in a channel having a closed cross-sectional periphery. The sound field contains oscillation or vibration modes propagating at a lower envelope velocity than the velocity of sound of the propagation medium.

BACKGROUND OF THE INVENTION

For the purpose of absorbing the sound of a sound field propagating in a liquid or gaseous medium it is known to use a multiple arrangement of Helmholtz resonators (sliding sound absorbers), connected, for example, to holes in the wall of a channel carrying the sound propagation medium and, which can also be provided with an acoustic damping material. However, in practice such Helmholtz resonators can only be used for effectively damping a relatively narrow-band frequency spectra of a sound field and, their use requires relatively large dimensions for the damping structure.

SUMMARY OF THE INVENTION

The object of the present invention is to provide a sound absorbing device which makes it possible to effectively damp a relatively wide-band frequency spectra of a sound field propagating in a liquid or in a particular gaseous propagation medium.

The present invention is based on the recognition of the fact that it is not only necessary to damp the fundamental oscillations of the sound field but also the higher order oscillating modes differing therefrom, in order to bring about a maximum wide-band damping of a sound field in a propagation medium in which a so called mode propagation takes place. In the case of mode propagation, the propagation field contains a number of oscillation types or modes with different frequencies and group velocities. Such mode propagation occurs more particularly in connection with gaseous or vaporous propagation media due to the low sound velocites therein. Thus, gaseous or vaporous propagation media constitute the preferred field of application for the present invention. However, a mode propagation may occur also in liquid sound propagation media, so that the invention can also be successfully used there.

With regard to the theory of mode propagation in a sound field, reference can be had to the analogous case of wave propagation of electromagnetic waves. Particularly in channels having a closed cross-sectional periphery, such mode propagation takes place in an identical manner to the wave propagation of electromagnetic waves in hollow wave guides. Thus, the invention is particualarly suitable for sound absorption in channels having a closed cross-sectional periphery containing a liquid or a particular gaseous propagation medium, e.g. air. The invention is effective for sound absorption both in a static propagation medium and, in a flowing propagation medium.

According to the fundamental solution of the invention, the sound field is acoustically subdivided over a portion of its propagation path into a plurality of sound channels of finite length running parallel to its propagation direction and, wherein the cross-section of these channels is preferably constant over their length. In nozzles the cross-section may vary like the nozzle does. Thus, similarly as in the propagation of electromagnetic waves in hollow wave guides, the oscillation modes of the sound field, whose half wavelength is greater than the largest cross-sectional width of the sound channels, becomes thereby, prevented from propagating across the channels. In other words, a particular portion of the oscillation modes of the sound field is filtered out, so that there is a corresponding damping of the sound propagation of the sound field.

Similarly to the propagation of electromagnetic waves in hollow waveguides, the subdivision of the sound field into a plurality of sound channels running parallel to the direction of propagation, also leads to the damping of higher oscillation modes of the sound field, which are below a cut-off frequency determined by the characteristic dimensions of the sound channels and the acoustic impedance of the boundary surfaces thereof. The length of the sound channels is finite, however, it preferably corresponds to at least a quarter of the wavelength of the sound oscillation having the lowest fundamental frequency in the sound field which is to be damped.

According to the present invention, adjacent sound channels are given different characteristic dimensions for the oscillation states in them. This leads to interferences of the oscillations passing out of the outlet ends thereof, so that a further damping takes place in the same manner, as in the known Quincke tube. (A sound transmission tube with two parallel branches, used for sound filtration).

Furthermore, due to the different oscillation states along the adjacent sound channels, local sound pressure differences occur between juxtaposed points perpendicular to the longitudinal direction thereof. According to the present invention this is utilized to bring about an additional damping over the entire length or at least part of the length of the adjacent sound channels by making the partition walls between the sound channels along their total length or at least over a partial length thereof permeable to the sound propagation medium and, consequently, permitting a local sound pressure transmission from one channel into the next, so that the sound pressure differences therebetween can at least locally and partly become compensated.

The present invention also ensures that the local sound pressure transmission from one sound channel into the adjacent channel takes place in a very lossy manner, so that a corresponding part of the velocity energy of the propagation medium oscillating in the sound channels becomes absorbed and, consequently, an additional damping of the sound oscillations is brought about in the channels. It is believed that it is particularly this type of oscillation damping which is responsible for the high damping effect obtainable through the invention over a wide band frequency spectrum of the sound field. In a comparative test, in the simplest case, damping values of 6 dB were obtained over a frequency range of 1 to 10 kHz with the apparatus according to the present invention.

As a result of the lossy local pressure transmission from one sound channel into another channel not only are the fundamental modes propagated in their longitudinal direction damped in a dissipative manner, but there is also damping of the higher oscillation types of the propagation field in the channel propagated at a lower group velocity than the velocity of sound therein, because such higher modes generally have a component of the acoustic velocity directed perpendicularly to the boundary wall between the adjacent channels and, this component is therefore effectively damped by the lossy pressure transmission. This lossy pressure transmission is achieved in that the permeable part of the partition walls separating the sound channels from one another contains a sound absorbing material, e.g. felt or sintered material and, therefore, the damping of pressure transmissions is brought about by frictional losses when the propagation medium passes through the partition.

According to a preferred embodiment of the present invention a plurality of lattice members forming a lattice work according to the invention are reciprocally spaced in the channel direction, and wherein said members can be identical or different. Tests have shown that in the case of a multiple arrangement of lattice members according to the invention the daming values obtainable essentially behave in an additive manner, i.e. the damping values in dB obtainable with each individual lattice member are summed when the members are arranged in series along the channel, substantially independently from the spacings used, provided that such spacings are not less than the size of an individual lattice member. A corresponding increase in the volume reduction is obtained by this additive behavior of a plurality of spaced lattice members. This additive behavior also shows that not only the higher oscillation types of the sound field propagating in the channel are damped, but also are damped the fundamental oscillations thereof falling within the action range of the lattice member.

Furthermore, through the selection of the average free spacing between the lattice members of the lattice work according to the present invention, it is possible to displace the damping range for the frequency spectrum of the propagating sound field towards other frequencies, more particularly, it becomes possible to widen the same. It has been found that in particular, sound oscillations in the lower range of the frequency spectrum of the sound field, which can generally be damped only with considerable effort and expenditure, can be damped according to the present invention if the free spacing between the lattice members corresponds to a quarter or half the wavelength of such a sound oscillation in the lower range of the frequency spectrum of the sound field. The damping which is optimum for a specific case of use can be discovered by relatively simple tests in which the free spacing between adjacently following lattice members is modified until an optimum occurs.

BRIEF DESCRIPTION OF THE DRAWINGS

The invention will become more readily apparent from the following description of preferred embodiments thereof shown, by way of example, in the accompanying drawings, in which:

FIG. 1 illustrates a channel section with a felt lattice member of the present invention inserted therein, and shown in side view;

FIG. 2 illustrates a perspective view the lattice member of FIG. 1; and

FIG. 3 illustrates a longitudinal section of a channel section which has a bend and with a plurality of lattice members of the present invention inserted therein.

DESCRIPTION OF THE PREFERRED EMBODIMENTS

The lattice member 2 of FIGS. 1 and 2 comprises vertically crossing felt plates subdividing the free cross-section of channel 1 which is illustrated as rectangular, into a total of nine partial channels 3 having the same cross-section. In each case three partial channels 3 are juxtaposed or superimposed in a row parallel to the longitudinal direction of channel 1. The felt plates forming the lattice members 2 constitute the partition walls 4 separating the adjacent partial channels 3. Similarly like the free cross-section of channel 1, the overall cross-section of lattice member 2 is rectangular. In longitudinal secton lattice member 2 is trapezoidal, the parallel trapezoidal sides running parallel to the direction of channel 1. One trapezoidal side which is inclined with respect to the channel direction, is located in the plane of face 5 of lattice member 2, which is therefore also inclined relative to the channel direction. The fourth trapezoidal side is perpendicular to the longitudinal direction of channel 1 and is located in the plane of the othere face 6 of lattice member 2.

The average length of lattice member 2 measured in the longitudinal direction of the channel is at least and preferably approximately a quarter of the length of the fundamental wave of the sound field propagating in the medium contained in channel 1. As is known, there is a cut-off frequency for the propagation of sound waves in a channel and, this is dependent on the cross-section of the channel and its acoustic wall impedance. Below this frequency, a damping of the oscillation states of the propagating sound field occurs. Similarly, there is such a cut-off frequency also for the partial channels 3 formed by the lattice member 2, so that the subdivision of the cross-section of the channel 1 into a plurality of partial chanels 3 leads to a damping of those oscillation types, whos frequency is above the cut-off frequency of channel 1 and, below the cut-off frequency of partial channels 3.

As a result of the aforementioned configuration of the longitudinal section of lattice member 2, the superimposed and adjacent partial channels 3 have different lengths, which are characteristic of the oscillation states in channels 3. Due to the impedance jumps at the open ends of the partial channels 3, static fundamental waves are formed therein with different wavelengths corresponding to the different lengths of the partial channels 3. Higher frequency oscillation types or modes are superimposed on these fundamental waves and the above-mentioned oscillation types are generally propagated in the longitudinal direction of partial channels 3 with a lower group velocity component than the speed of sound.

Due to the different oscillation states present in partial channels 3 resulting from the differing lengths of adjacent channels 3, oscillation interferences occur at the outlet side of lattice member 2 and behind the latter, which can also lead to a damping of the propagating sound field. In addition, the different oscillation states in adjacent partial channels 3, lead to local sound pressure differences of different lengths over the length of adjacent channel 3. As the partitioning walls 4 are made from a felt material permeable to the propagation medium in the channel, the local pressure differences locally force the propagation medium through the particular partition 4, so that it flows from one partial channel into the adjacent channel. As a result, the local pressure differences are at least partly compensated. The velocity of the overflowing propagation medium is reduced by friction in the damping material in partition 4, so that part of the propagation energy of the sound vibrations propagating in the partial channels 3 is absorbed by partitions 4. This damping process due to the overflow of the propagation medium from one partial channel into the next channel is assisted for the higher oscillation modes propagated therein in that in the case of a complex wall impedance, they generally have an acoustic velocity component which is perpendicular to the wall. By and as a result of this absorption of part of the velocity energy of the oscillation types propagating in partial channels 3, there is an additional powerful damping over a relatively wide frequency range.

FIG. 3 shows in an illustrative manner a multiple arrangement of lattice members 2 of the type described with respect to FIGS. 1 and 2 in a channel 1 including a bend 7. Bend 7 contains a lattice member 2 which, in longitudinal section is constructed as an angular segment adapted to the configuration of bend 7. The faces 5 and 6 of the lattice member 2 intersect in this embodiment at the centre of curvature of the bend 7 and its partial channels 3 are concentric to such centre. For a medium flowing in channel 1 this lattice member 2 also acts as a guide mechanism, which reduces the flow resistance of bend 7.

In this embodiment additional lattice members are spaced in front of and behind bend 7. Due to such a multiple arrangement of lattice members 2 spaced along the channel 1, it is possible to sum the damping values of each individual member 2.

The two spaced lattice members 2 on the lefthand side of FIG. 3 correspond in their construction to the lattice member 2 of FIGS. 1 and 2 and are arranged in such a way that the inclined face 5 of one lattice member faces face 6 of the other lattice member which is perpendicular to the channel direction. This arrangement generally increases the interference phenomena in the space between the two lattice members 2 contributing to the sound damping and, furthermore, oscillations in the lower range of the frequency spectrum of the propagating sound field become significantly damped if the spacing between the successive lattice members 2 is approximately a quarter or half the wavelength of this low frequency oscillation.

Reductions in damping values can occur above a certain flow rate in the case of channels 1 in which the sound and the flow have the same propagation direction. However, in the case of the sound and flow propagation directions being opposite to one another an improvement of the sound damping action occurs in the higher flow rate range compared with a channel through which there is no flow.

EXAMPLE

A lattice member 2 made from nylon felt material similarly as in FIG. 1 except having three vertical and four horizontal partition walls resulting in twenty partial channels when it was placed in a rectangular wind tunnel with walls made from an asbestos material and with a free cross-section of 200×140 mm. The cross-section became subdivided into twenty identical partial channels, whereof in each case four were juxtaposed and five were superimposed. In accordance with FIG. 1, the lattice member was trapezoidal in longitudinal section. The short base side of the trapeze had a length of 150 mm, whilst the long base side had a length of 250 mm. The thickness of the partition walls 4 was 3.5 mm.

Under the test conditions damping values of 6 dB were obtained over a frequency range of 1 to 10 kHz. These damping values were approximately twice as high as with a comparative lattice member which was made from a metal sheet instead of from felt and with a 1 mm wall thickness.

In the case of a multiple arrangement of three felt lattice members 2, one being arranged in a channel bend 7 according to FIG. 3, with one in front of and one behind the bend in channel 1, the width of the damped frequency band could be extended upwards and downwards to a damping range of 400 Hz to 20 kHz. In the 7 kHz range maximum damping values of up to 26 dB were obtained, compared with typical damping values of 6 to 10 dB with sheet metal lattice members.

From the above it is seen that the present invention is particularly suitable for the effective, wide-band sound absorption of the sound field propagating in a liquid or in a particular gaseous propagation medium contained in a channel and specifically in the longitudinal direction of the latter. To this end the channel should contain at least one lattice member which subdivides the free channel cross-section over a channel section of predetermined length in the manner of a guide blade into a plurality of partial channels which have a larger longitudinal dimension than their width and are open at both ends, the walls of the lattice member extending in juxtaposed manner at right angles to each other and parallel to the channel direction and bounding the aforementioned sound channels.

As a result of the selection of the cross-sectional shape of the partial channels, the present invention makes it possible to adapt to the oscillation types of the sound field propagating in the channel 1 and/or these oscillation types present in the partial channels 3 along with increasing the damping effect or displacing or widening the damping spectrum. Thus, the partial channels can have a round or angular cross-section, the latter being at present preferred. Generally, the specific cross-sectional shape used for the lattice member is dependent on the cross-section of the main channel, the controlling purpose being of obtaining a simply constructed lattice member. If the channel cross-section is rectangular, the cross-section of the partial channels can also be rectangular. However, if the channel cross-section is circular, it is advantageous to construct the lattice members from radial partition walls, so that the cross-section of the partial channels is circular segment-shaped. Optionally such partial channels can be further subdivided by means of tubes or wallsheets running concentrically or in a spiral with respect to the channel axis.

The inventions makes it possible to use different cross-sectional widths, cross-sectional surfaces and/or acoustic wall impedances for adjacent partial channels with different characteristic dimensions in order to bring about different oscillation states over the length thereof. Accordingly, different cross-sectional shapes are possible. The length is the preferred different characteristic dimension of adjacent partial channels, so that the standing waves occurring at their two open ends 5 and 6 due to the impedance jumps there, have correspondingly different wavelengths. Thus, the pressure distribution over the length of one partial channel 3 differs from that over the length of the other partial channel and, consequently, local pressure differences occur between them. Thus, the lattice member 2 on at least one of its faces at which the partial channels terminate, is constructed in such a manner that the openings of adjacent channels 3 are axially spaced from one another (measured parallel to the channel direction). A face of the lattice member 2 can be in the form of a plurality of axially displaced peripheral surface portions directed perpendicular to the channel direction. However, it is also possible to make this face in the form of a cone or pyramid-shaped shell or inclined with respect to the channel direction having some other geometry. The face is preferably in a plane which is inclined with respect to the channel direction. Particularly in the case of large ratios between the channel cross-section and the wavelength of the waves to be damped, it can be advantageous to make the face from surface portions which are approximately zig-zag shaped in side view and, which are inclined to the channel direction and, which extend over the openings of a plurality of adjacent partial channels.

As another aspect, the pressure differences in adjacent partial channels can be obtained in that in the case of indentical dimensions, they are axially displaced with respect to one another and, consequently, the oscillation states therein are accordingly out of phase with respect to each other.

The effectiveness of the sound absorbing device according to the present invention has been proved by tests performed in a wind tunnel with and without flow of the propagation medium. If the sound absorbing device according to the invention is used in channels carrying a flowing propagation medium and having a bend, the lattice member according to the invention is to be preferably located in the bend, because it can then be simultaneously used as a low-resistance flow deflector. The lattice member 2 is then curved with its partial channels in accordance with the curvature of the bend, i.e. in the simplest case they are concentric to one another and to the bend. However, it is also possible to use aerodynamically optimized deflection lattices. The lattice member according to the invention can additionally be used with particular advantage at other points or cross-sectional change of the channel, e.g. at the points of entry or exit to cross-sectional constrictions or the like for the purpose of low-resistance flow deflection.

Thus, in summary, the invention provides a relatively wide-band damping by using a comparatively simple means at low constructional expenditure. The damping means of the invention can be used for sound absorption in a static propagation medium and in particular in a flowing propagation medium, e.g., in a wind tunnel. With flowing propagation media the additional advantage is obtained that a lattice member according to the invention can also be used for low-resistance flow deflection and turbulence reduction, as well as for forming specific flow profiles. The lattice members according to the present invention can also contribute to the local mechanical stiffening of a channel structure.

Although the invention has been described in its preferred form with a certain degree of particularity, it will be understood that the present disclosure of the preferred embodiments has been made only by way of example and that numerous changes may be resorted to without departure from the true spirit and scope of the invention as hereinafter claimed. It is intended that the patent shall cover, by suitable expression in the appended claims, whatever features of patentable novelty exist in the invention disclosed.

I claim:

1. Apparatus for damping a sound field propagating in a fluid propagation medium within a main channel (1) having a closed cross-sectional periphery, comprising at least one first lattice work (2) arranged in said main channel (1) for extending between a first longitudinal section and a second longitudinal section of the free main channel cross-section, said lattice work being comprised of first and second thin partition wall means crossing each other and subdividing the free channel cross-section in the manner of a guide blade into a plurality of partial channels (3) for juxtaposed and superposed branching between said first and second longitudinal sections, said partial channels running in the direction of the main channel and being open at both longitudinal ends and having a length which is larger than the cross-sectional width dimensions of said partial channels, said length being at least a quarter of the wavelength of the sound oscillation having the lowest fundamental frequency of said sound field, wherein at least predetermined ones of adjacent partial channels (3) have different lengths for producing different sound oscillation states therein to be out of phase in said predetermined ones of adjacent partial channels, whereby in said predetermined ones of adjacent partial channels local sound pressure differences are produced and distributed over their length, said partition wall means (2) between said predetermined ones of adjacent partial channels (3) of different lengths being permeable for the propagation medium, at least over a partial length for causing at least partly local sound pressure difference compensation of said local sound pressure differences by a flow of the propagation medium from the one of the predetermined ones of said adjacent partial channels (3) into the adjacent one thereof, said wall means comprising a damping material, such as felt or sintered material, for frictionally damping said flow of the propagation medium.

2. The sound damping apparatus as claimed in claim 1, wherein at least one (5) of the two faces (5,6) of said lattice work (2) at which the partial channels open into said first and second sections, respectively, is obliquely inclined with respect to the channel direction.

3. The sound damping apparatus as claimed in claim 1, wherein said main channel includes a bent elbow portion and said lattice work (2) is arranged in said elbow portion (7) of said main channel (1).

4. The sound damping apparatus as claimed in claim 1, wherein said first and second partition wall means comprise a plurality of first and second straight plate means, said first plate means running horizontally and parallel with said channel direction and said second plate means being arranged in a plane lying parallel with said channel direction and crossing said horizontal plate means at right angles thereto, whereby a plurality of said partial channels are formed having generally a rectangular cross-section.

5. A lattice work for damping a sound field propagation in a fluid propagation medium within a main channel, said lattice work comprising thin partition wall means crossing each other for subdividing the free main channel cross section in the manner of a guide blade, when placed into said main channel, for branching it between a first and a second longitudinal section of the main channel into a plurality of partial channels (3), said partial channels having a longitudinal dimension which is larger than the corresponding cross-sectional dimension of said partial channels, said lattice work being shaped to have said partial channels open at both end thereof, said longitudinal direction of said partial channels running in the direction of the main channel when the lattice work is placed into said main channel, wherein at least some of adjacent partial channels (3) have different lengths for the sound oscillation state therein, whereby in said adjacent partial channels local sound pressure differences are produced and distributed over their length, at least part of the partition wall means being permeable for the propagation medium for the local sound pressure transfer from one partial channel (3) into an adjacent one, to at least locally and partly compensate said local sound pressure differences, said partition wall means having a thickness of 3.5 mm.

6. Apparatus for damping a sound field in a fluid propagation medium within a main channel having a closed cross-sectional periphery, comprising at least two lattice works spaced from each other by a longitudinal section of the free main channel cross-section, each of said lattice works being comprised of first and second partition wall means crossing each other and subdividing the free main channel cross-section into a plurality of juxtaposed and superposed partial channels running in the direction of the main channel and being open at both longitudinal ends and having a length which is larger than the cross-sectional width dimension of said partial channels, wherein at least predetermined ones of adjacent partial channels have different characteristic dimensions for producing different sound oscillation states therein, whereby in said predetermined ones of adjacent partial channels local sound pressure differences are produced and distributed over their length, said partition wall means between said predetermined ones of adjacent partial channels of different characteristic dimensions being permeable for the propagation medium, at least over a partial length to cause at least partly local sound pressure difference compensation of said local sound pressure differences by a flow of the propagation medium from one of the predetermined ones of said adjacent partial channels into the adjacent one thereof, said wall means comprising a damping material, such as felt or sintered material, for frictionally damping said flow of the propagation medium, said longitudinal section having a longitudinal dimension corresponding approximately to a quarter or half of the wave length of a sound oscillation in the lower range of the frequency spectrum of said field.

7. The sound damping apparatus as claimed in claim 6, wherein said main channel includes a bent elbow portion and one of said lattice works is arranged in said elbow portion, the other of said lattice works being spaced from said elbow portion.

8. Apparatus for damping a sound field propagating in a fluid propagation medium within a main channel having a closed cross-sectional periphery, comprising at least two lattice works spaced from each other by a longitudinal section of the free main channel cross-section, each of said lattice works being comprised of first and second partition wall means crossing each other and subdividing the free main channel cross-section into a plurality of juxtaposed and superposed partial channels running in the direction of the main channel and being open at both longitudinal ends and having a length which is larger than the cross-sectional width dimensions of said partial channels, wherein at least predetermined ones of adjacent partial channels have different lengths for producing different sound oscillation states therein, whereby in said predetermined ones of adjacent partial channels of different lengths local sound pressure differences are produced and distributed over their length, said partition wall means between said predetermined ones of adjacent partial channels of different lengths being permeable for the propagation medium, at least over a partial length to cause at least partly local sound pressure difference compensating of said local sound pressure differences by a flow of the propagation medium from one of the predetermined ones of said adjacent partial channels into the adjacent one thereof, said wall means comprising a damping material, such as felt or sintered material, for frictionally damping said flow of the propagation medium said longitudinal section having a longitudinal dimension corresponding approximately to a quarter or half of the wave length of a sound oscillation in the lower range of the frequency spectrum of said sound field.

9. The sound damping apparatus as claimed in claim 6, wherein said different characteristic dimensions of adjacent partial channels includes the length thereof whereby said adjacent partial channels have different lengths.

10. The sound damping apparatus as claimed in claim 8, wherein one of the facing faces of said first and second adjacent lattice works is obliquely inclined with respect to the main channel direction, the other face being perpendicular to the main channel direction.

11. Apparatus for damping a sound field propagating in a fluid propagation medium within a main channel having a closed circular cross-section periphery, comprising at least one first lattice work arranged in said main channel for extending between a first longitudinal section and a second longitudinal section of the free main channel cross-section, said lattice work being comprised of a plurality of partition walls extending radially with respect to the main channel cross-section, and a plurality of wallsheets running concentrically or in a spiral with respect to the main channel axis and crossing said radial partition walls, thereby subdividing the free main channel cross-section in the manner of a guide blade into a plurality of partial channels for branching between said first and second longitudinal sections, said partial channels running in the direction of the main channel and being open at both longitudinal ends and having a length which is larger than the cross-sectional width dimensions of said partial channels and which is at least a quarter of the wave length of the sound oscillation having the lowest fundamental frequency of said sound field, wherein at least predetermined ones of adjacent partial channels have different characteristic dimensions for producing different sound oscillation states therein to be out of phase in said predetermined ones of adjacent partial channels, thereby producing in said predetermined ones of adjacent partial channels local sound pressure differences distributed over their lengths, said partition walls between said predetermined ones of adjacent partial channels of different characteristic dimensions being permeable for the propagation medium, at least over a partial length, to cause at least partly local sound pressure difference compensation of said local sound pressure differences by a flow of the propagation medium from one of the predetermined ones of adjacent partial channels into the adjacent one thereof, said partition walls comprising a damping material, such as felt or sintered material, for frictionally damping said flow of the propagation medium.

12. The sound damping apparatus as claimed in claim 11, wherein said different characteristic dimensions of adjacent partial channels includes said the length thereof whereby said adjacent partial channels have different lengths.

13. The sound damping apparatus as claimed in claim 12, wherein at least one of the two faces of said lattice work at which the partial channels open into said first and second sections, respectively, is obliquely inclined with respect to the channel direction.

14. The sound damping apparatus as claimed in claim 11, wherein said main channel includes a bent elbow portion and said lattice work is arranged in said elbow portion of said main channel.

* * * * *